(12) United States Patent
Kwon et al.

(10) Patent No.: US 11,136,639 B2
(45) Date of Patent: Oct. 5, 2021

(54) BEARING STEEL AND MANUFACTURING METHOD THEREFOR

(71) Applicant: ILJIN GLOBAL CO., LTD., Seoul (KR)

(72) Inventors: Oh Chul Kwon, Seoul (KR); Seon Ho Lee, Seoul (KR); Yoon Gil Choi, Seoul (KR); Chirl Soo Shin, Seoul (KR)

(73) Assignee: ILJIN GLOBAL CO., LTD, Seoul (KR)

( * ) Notice: Subject to any disclaimer, the term of this patent is extended or adjusted under 35 U.S.C. 154(b) by 0 days.

(21) Appl. No.: 16/313,583

(22) PCT Filed: Jun. 30, 2017

(86) PCT No.: PCT/KR2017/006991
§ 371 (c)(1),
(2) Date: Dec. 27, 2018

(87) PCT Pub. No.: WO2018/004312
PCT Pub. Date: Jan. 4, 2018

(65) Prior Publication Data
US 2019/0256939 A1 Aug. 22, 2019

(30) Foreign Application Priority Data
Jul. 1, 2016 (KR) .......................... 10-2016-0083318

(51) Int. Cl.
*C21D 1/18* (2006.01)
*C21D 1/28* (2006.01)
(Continued)

(52) U.S. Cl.
CPC .................................... *C21D 9/40* (2013.01);
*B21J 1/06* (2013.01); *C21D 1/18* (2013.01);
*C21D 1/28* (2013.01);
(Continued)

(58) Field of Classification Search
CPC ... C21D 1/42; C21D 1/18; C21D 1/28; C21D 9/40; C21D 6/004; C21D 6/005;
(Continued)

(56) References Cited

U.S. PATENT DOCUMENTS 7,004,637 B1* 2/2006 Uyama ................... B60B 27/00
384/544
2011/0274578 A1* 11/2011 Mizuno ..................... C23C 8/26
420/84
2013/0180626 A1 7/2013 Yoshida

FOREIGN PATENT DOCUMENTS

EP 1215292 6/2002
EP 1541377 6/2005
(Continued)

OTHER PUBLICATIONS

Extended European Search Report, issued in the corresponding European patent application No. 17820588.6, dated May 8, 2019, 9 pages.
(Continued)

*Primary Examiner* — Daniel J. Schleis
*Assistant Examiner* — Kevin Ct Li
(74) *Attorney, Agent, or Firm* — Dinsmore & Shohl LLP; Yongsok Choi, Esq.

(57) ABSTRACT

A bearing steel according to an embodiment of the present disclosure includes, as a chemical composition: 0.51 to 0.56 wt % of carbon (C); 0.30 to 0.55 wt % of silicon (Si); 0.60 to 0.90 wt % of manganese (Mn); 0.025 wt % or less (excluding 0 wt %) of phosphorus (P); 0.008 wt % or less (excluding 0 wt %) of sulfur (S); 0.01 to 0.20 wt % of chromium (Cr); 0.08 wt % or less (excluding 0 wt %) of molybdenum (Mo); 0.25 wt % or less (excluding 0 wt %) of nickel (Ni); 0.01 to 0.20 wt % of vanadium (V); 0.20 wt % or less (excluding 0 wt %) of copper (Cu); 0.003 wt % or less (excluding 0 wt %) of titanium (Ti); 0.01 to 0.05 wt % of
(Continued)

aluminum (Al); 0.0015 wt % or less (excluding 0 wt %) of oxygen (O); 0.001 wt % or less (excluding 0 wt %) of calcium (Ca); and iron (Fe) and unavoidable impurities as a remainder.

10 Claims, 2 Drawing Sheets

(51) Int. Cl.

| | | |
|---|---|---|
| *C21D 6/00* | (2006.01) | |
| *C21D 9/40* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/50* | (2006.01) | |
| *F16C 19/18* | (2006.01) | |
| *F16C 33/64* | (2006.01) | |
| *C21D 1/42* | (2006.01) | |
| *B21J 1/06* | (2006.01) | |
| *F16C 33/62* | (2006.01) | |

(52) U.S. Cl.
CPC .............. *C21D 1/42* (2013.01); *C21D 6/004* (2013.01); *C21D 6/005* (2013.01); *C21D 6/008* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/50* (2013.01); *F16C 19/183* (2013.01); *F16C 33/64* (2013.01); *C21D 2211/005* (2013.01); *C21D 2211/008* (2013.01); *C21D 2211/009* (2013.01); *F16C 19/184* (2013.01); *F16C 33/62* (2013.01); *F16C 2204/64* (2013.01); *F16C 2220/46* (2013.01); *F16C 2223/10* (2013.01); *F16C 2240/48* (2013.01); *F16C 2326/02* (2013.01); *Y02P 10/25* (2015.11)

(58) Field of Classification Search
CPC .............. C21D 6/008; C21D 2211/005; C21D 2211/008; C21D 2211/009; F16C 33/64; F16C 33/62; F16C 19/183; F16C 2223/10; F16C 2220/46; F16C 2240/48; F16C 19/184; F16C 2204/64; F16C 2326/02; Y02P 10/253; B21J 1/06; C22C 38/002; C22C 38/02; C22C 38/04; C22C 38/06; C22C 38/42; C22C 38/44; C22C 38/46; C22C 38/50
See application file for complete search history.

(56) References Cited

FOREIGN PATENT DOCUMENTS

| | | |
|---|---|---|
| EP | 1731776 | 12/2006 |
| EP | 2966189 | 1/2016 |
| JP | 01129952 | 5/1989 |
| JP | 07-018379 | 1/1995 |
| JP | 0979339 | 3/1997 |
| JP | 09287054 | 11/1997 |
| JP | 2010-058575 | 3/2010 |
| JP | 2013-112841 | 6/2013 |
| JP | 2013112841 A * | 6/2013 |
| JP | 2015-030900 | 2/2015 |
| KR | 10-2008-0039284 | 5/2008 |
| KR | 10-2012-0087184 | 8/2012 |
| KR | 10-1280547 | 7/2013 |

OTHER PUBLICATIONS

International Search Report, issued in the corresponding PCT application No. PCT/KR2017/006991, dated Oct. 30, 2017, 5 pages.
Notice of Allowance, issued in the corresponding Korean patent application No. 10-2016-0083318, dated Oct. 20, 2017, 7 pages.

* cited by examiner

BEARING STEEL AND MANUFACTURING METHOD THEREFOR

TECHNICAL FIELD

The present disclosure relates to a bearing steel and a manufacturing method therefor.

BACKGROUND

A steel material applied to an outer race and a hub shaft of an automotive wheel bearing is S55C medium carbon steel containing 0.55 to 0.59 weight-percent (hereinafter, "wt %") of carbon (C), 0.15 to 0.30 wt % of silicon (Si), 0.75 to 0.90 wt % of manganese (Mn), and the like. Such medium carbon steel is hot-forged and then surface-hardened by high-frequency heat treatment, thereby securing wear resistance of a raceway and main portions and strengthening hardness thereof. In addition, since a high bearing stress is repeatedly applied to the raceway portion of the outer race and the hub shaft, there is a need for excellent rolling contact fatigue life.

Since a bearing steel based on such medium carbon steel is manufactured under the temperature of a high-frequency heat treatment, there is a high probability of crystal grain coarsening due to overheating and quenching failure such as cooling failure. Moreover, as recent trends of high power of automotive engines and weight reduction of automotive weight result in a poor environment in which driving parts such as automotive wheel bearings are used, it is difficult to satisfy durability, including rolling contact fatigue life and fatigue strength, which are required for the driving parts, by a conventional material and heat treatment.

SUMMARY

The present disclosure provides a bearing steel and a manufacturing method therefor that solves the above-described problems. The crystal grains of the bearing steel is micronized by adding grain refinement alloy elements, such as silicon, vanadium, aluminum, and the like, on the basis of medium carbon steel and performing high-frequency heat treatment.

A bearing steel according to one embodiment of the present disclosure may have a composition that includes: 0.51 to 0.56 wt % of carbon (C); 0.30 to 0.55 wt % of silicon (Si); 0.60 to 0.90 wt % of manganese (Mn); 0.025 wt % or less (excluding 0 wt %) of phosphorus (P); 0.008 wt % or less (excluding 0 wt %) of sulfur (S); 0.01 to 0.20 wt % of chromium (Cr); 0.08 wt % or less (excluding 0 wt %) of molybdenum (Mo); 0.25 wt % or less (excluding 0 wt %) of nickel (Ni); 0.01 to 0.20 wt % of vanadium (V); 0.20 wt % or less (excluding 0 wt %) of copper (Cu); 0.003 wt % or less (excluding 0 wt %) of titanium (Ti); 0.01 to 0.05 wt % of aluminum (Al); 0.0015 wt % or less (excluding 0 wt %) of oxygen (O); 0.001 wt % or less (excluding 0 wt %) of calcium (Ca); and iron (Fe) and unavoidable impurities as a remainder.

In one embodiment, the bearing steel may include: a substrate; and a hardened layer formed on a surface of the substrate, the substrate includes a ferrite structure and a pearlite structure, and the hardened layer includes a martensite structure.

In one embodiment, austenite crystal grains having an average diameter of 22.5 to 31.8 µm may be formed on the substrate.

In an embodiment, austenite crystal grains having an average diameter of 5 µm or less may be formed on the hardened layer.

A method of manufacturing a bearing steel according to one embodiment of the present disclosure may include: continuous casting and rolling a steel, the steel including 0.51 to 0.56 wt % of carbon (C), 0.30 to 0.55 wt % of silicon (Si), 0.60 to 0.90 wt % of manganese (Mn), 0.025 wt % or less (excluding 0 wt %) of phosphorus (P), 0.008 wt % or less (excluding 0 wt %) of sulfur (S), 0.01 to 0.20 wt % of chromium (Cr), 0.08 wt % or less (excluding 0 wt %) of molybdenum (Mo), 0.25 wt % or less (excluding 0 wt %) of nickel (Ni), 0.01 to 0.20 wt % of vanadium (V), 0.20 wt % or less (excluding 0 wt %) of copper (Cu), 0.003 wt % or less (excluding 0 wt %) of titanium (Ti), 0.01 to 0.05 wt % of aluminum (Al), 0.0015 wt % or less (excluding 0 wt %) of oxygen (O), 0.001 wt % or less (excluding 0 wt %) of calcium (Ca), and iron (Fe) and unavoidable impurities as a remainder; hot-forging the rolled steel; and high-frequency quenching and tempering the hot-forged steel.

In one embodiment, in the hot-forging, the temperature of the hot-forging may be 1150 to 1250 degrees C.

In one embodiment, the method may further include normalizing or refining after the hot-forging.

In one embodiment, in the normalizing, the temperature of normalizing may be 880 to 910 degrees C.

In one embodiment, the refining may include: quenching at 850 to 880 degrees C.; and tempering at 500 to 600 degrees C.

In one embodiment, in the high-frequency quenching and tempering, the temperature of the high-frequency quenching may be 750 to 1000 degrees C. More specifically, the temperature of the high-frequency quenching may be 780 to 850 degrees C.

In one embodiment, in the high-frequency quenching and tempering, the temperature of tempering may be 150 to 200 degrees C.

An automotive wheel bearing according to one embodiment of the present disclosure may include the above-described bearing steel.

An automotive wheel bearing according to one embodiment of the present disclosure may include a bearing steel manufactured by the above-described method of manufacturing a bearing steel.

According to embodiments of the present disclosure, it is possible to provide a bearing steel in which fine austenite crystal grains is formed on the surface of the hardened layer by adding grain refinement elements on the basis of medium carbon steel and performing the heat treatment at a low temperature. It is possible to provide an automotive wheel bearing having improved durability by using such a bearing steel when the automotive wheel bearing is manufactured.

Furthermore, according to embodiments of the present disclosure, it is possible to provide a bearing steel having improved toughness by micronizing crystal grains. It is possible to provide an automotive wheel bearing in which crack occurrence is reduced and service life is improved by using such a bearing steel.

DETAILED DESCRIPTION

Figure 1:
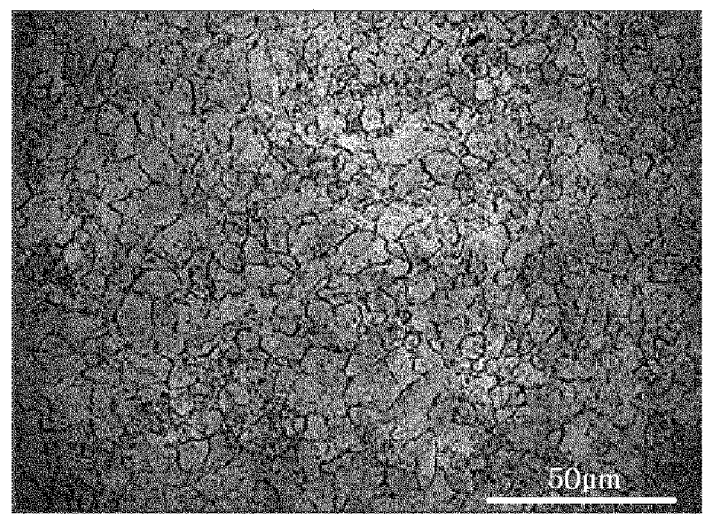
FIG. 1 is an optical microscopic image showing a microstructure of a hardened layer in a bearing steel according to Example 1.

The advantages and features of the present disclosure and methods of achieving the same will be apparent by referring to aspects of the present disclosure as described below in detail in conjunction with the accompanying drawings. However, the present disclosure is not limited to the aspects set forth below, but may be implemented in various different forms. The following aspects are provided only to completely disclose the present disclosure and inform those skilled in the art of the scope of the present disclosure, and the present disclosure is defined only by the scope of the appended claims. Throughout the specification, the same or like reference numerals designate the same or like elements.

Hereinafter, a bearing steel and a manufacturing method therefor according to preferable embodiments of the present disclosure will be described with reference to the accompanying drawings. In the following description, a detailed description of known functions and configurations incorporated herein will be omitted when it is determined that the detailed description may obscure the gist of the present disclosure.

A bearing steel according to one embodiment of the present disclosure has a composition that includes: 0.51 to 0.56 wt % of carbon (C); 0.30 to 0.55 wt % of silicon (Si); 0.60 to 0.90 wt % of manganese (Mn); 0.025 wt % or less (excluding 0 wt %) of phosphorus (P); 0.008 wt % or less (excluding 0 wt %) of sulfur (S); 0.01 to 0.20 wt % of chromium (Cr); 0.08 wt % or less (excluding 0 wt %) of molybdenum (Mo); 0.25 wt % or less (excluding 0 wt %) of nickel (Ni); 0.01 to 0.20 wt % of vanadium (V); 0.20 wt % or less (excluding 0 wt %) of copper (Cu); 0.003 wt % or less (excluding 0 wt %) of titanium (Ti); 0.01 to 0.05 wt % of aluminum (Al); 0.0015 wt % or less (excluding 0 wt %) of oxygen (O); 0.001 wt % or less (excluding 0 wt %) of calcium (Ca); and iron (Fe) and unavoidable impurities being a remainder.

The amount of carbon (C) is 0.51 wt % to 0.56 wt %. Carbon (C) contained in a steel is a main element to determine strength and hardness. In order to secure a surface hardness of 700 HV or more required for an automotive wheel bearing after high-frequency heat treatment, at least 0.51 wt % or more of carbon (C) needs to be added. When carbon (C) is added too much, hardness of the steel increases. Thus, forgeabilty and machinability deteriorate. As a result, the content of carbon (C) is limited to the above-mentioned range.

The amount of silicon (Si) is 0.30 wt % to 0.55 wt %. Silicon (S) is solubilized in a matrix to enhance grain boundaries, increase nucleation sites of austenite at the time of high-frequency heat treatment, and inhibit the growth of austenite crystal grains, thereby serving to micronize crystal grains in a high-frequency hardened layer. In one embodiment of the present disclosure, silicon (Si) is added for micronization of austenite crystal grains. When less than 0.30 wt % of silicon (Si) is added, it fails to secure sufficient fatigue strength and obtain a crystal grain micronizing effect. When silicon (Si) is added too much, hardness of the steel increases. Thus, forgeabilty and machinability deteriorate. As a result, the content of silicon (Si) is limited to the above-mentioned range.

The amount of manganese (Mn) is 0.60 wt % to 0.90 wt %. Manganese (Mn), which is an element to improve hardenability and enhance strength of the steel, may be combined with sulfur (S) to form manganese sulfide (MnS). Accordingly, machinability is improved. When manganese (Mn) is added too much, hardness of the steel increases. Thus, forgeabilty and machinability deteriorate. As a result, the content of manganese (Mn) is limited to the above-mentioned range.

The amount of phosphorus (P) is 0.025 wt % or less (excluding 0 wt %). Phosphorus (P) is an unavoidable impurity contained in the steel. Phosphorus (P) may be segregated into grain boundaries (e.g., austenite grain boundaries), as a form of iron phosphide ($Fe_3P$) severely vulnerable in the steel. Thus, grain boundary strength, fatigue strength, impact resistance, and rolling contact fatigue life can deteriorate. Moreover, since phosphorus (P) causes cracks when quenching, it is preferable to contain phosphorus (P) as little as possible. Therefore, the content of phosphorus (P) is limited to the above-mentioned range.

The amount of sulfur (S) is 0.008 wt % or less (excluding 0 wt %). Sulfur (S), which is an unavoidable element contained in the steel, may be combined with manganese (Mn) in the steel to form manganese sulfide (MnS). Thus, machinability is improved. However, when sulfur (S) is contained too much, sulfur (S) is segregated into grain boundaries to thereby degrading grain boundary strength and hot processability. Thus, it is preferable to contain sulfur (S) as little as possible. As a result, the content of sulfur (S) is limited to the above-mentioned range.

The amount of chromium (Cr) is 0.01 wt % to 0.20 wt %. Chromium (Cr) improves hardenability, enhances fatigue strength by securing a sufficient thickness of the hardened layer, and improves impact resistance by forming a carbide. However, when chromium (Cr) is contained too little, it is difficult to secure a sufficient hardened layer. When chromium (Cr) is contained too much, residual carbides are formed and grain boundary strength deteriorates. As a result, the content of chromium (Cr) is limited to the above-mentioned range.

The amount of molybdenum (Mo) is 0.08 wt % or less (excluding 0 wt %). Molybdenum (Mo), which is an unavoidable element contained in the steel, can improve hardness of the hardened layer after high-frequency quenching. However, when molybdenum (Mo) is contained too much, a hardness increasing effect is saturated and manufacturing cost increases. As a result, the content of molybdenum (Mo) is limited to the above-mentioned range.

The amount of nickel (Ni) is 0.25 wt % or less (excluding 0 wt %). Preferably, the amount of nickel (Ni) is 0.04 wt % or less (excluding 0 wt %). Nickel (Ni) can improve high-frequency hardenability, prevent the deterioration of grain boundary strength by inhibiting carbide growth, and enhance fatigue strength. However, when nickel (Ni) is added in large quantities, processability deteriorates and fatigue strength and manufacturing cost increase. As a result, the content of nickel (Ni) is limited to the above-mentioned range.

The amount of vanadium (V) is 0.01 wt % to 0.20 wt %. According to one embodiment, vanadium (V), which is an element added to micronize crystal grains of a steel material, may be combined with carbon (C) and nitrogen (N) to form a fine carbonitride. Thus, crystal grains are micronized, coarsening temperature of austenite crystal grains increases, and fatigue strength and toughness are improved. In addition, since high-frequency hardenability and temper softening resistance are improved, high-temperature strength is improved. When vanadium (V) is less than 0.01 wt %, an effect therefrom is little. When vanadium (V) is more than 0.02 wt %, the effect therefrom is saturated. Although strength increases, toughness deteriorates and manufacturing cost increases. As a result, the content of vanadium (V) is limited to the above-mentioned range.

The amount of copper (Cu) is 0.20 wt % or less (excluding 0 wt %). Preferably, the amount of copper (Cu) is 0.086 wt % or less (excluding 0 wt %). Copper (Cu), which is an element mixed from iron ore, scraps, or manufacturing environments during steel making, improves high-frequency hardenability, like carbon (C) and manganese (Mn). However, when copper (Cu) is added too much, cracks are generated during hot processing and fatigue strength of the steel deteriorate. As a result, the content of copper (Cu) is limited to the above-mentioned range.

The amount of titanium (Ti) is 0.003 wt % or less (excluding 0 wt %). Titanium (Ti), which is an unavoidable element contained in the steel, may is combined with carbon (C) and nitrogen (N) contained in the steel to form titanium nitride (TiN) and titanium carbonitride (TiCN), as a carbide and a carbonitride. Thus, titanium nitride (TiN) and titanium carbonitride (TiCN) become starting points for rolling contact fatigue damage, thereby degrading fatigue life. As a result, the content of titanium (Ti) is limited to the above-mentioned range.

The amount of aluminum (Ar) is 0.01 wt % to 0.05 wt %. Aluminum (Al) is an alloy component added as a deoxidizing agent during steel making and a crystal grain micronizing element. Since the growth of austenite crystal grains is inhibited during high-frequency heat treatment, crystal grains in a high-frequency hardened layer are micronized. When aluminum (Al) is too little, an effect therefrom is not shown. When aluminum (Al) is too much, high-frequency hardenability deteriorates and fatigue life of the steel deteriorates by the formation of a non-metallic inclusion of alumina ($Al_2O_3$). As a result, the content of aluminum (Al) is limited to the above-mentioned range.

The amount of oxygen (O) is 0.0015 wt % or less (excluding 0 wt %). Oxygen (O) is an unavoidable element contained in the steel. Oxygen (O) is an unfavorable element forming an oxide-based non-metallic inclusion, such as alumina ($Al_2O_3$), which becomes a starting point for rolling contact fatigue damage. Therefore, it is preferable to include oxygen (O) as little as possible. Since recent automotive wheel bearings require high durability, the content of oxygen (O) contained in the steel is limited to the above-mentioned range.

The amount of calcium (Ca) is 0.001 wt % or less (excluding 0 wt %). Calcium (Ca) is an unavoidable element contained in the steel. When calcium (Ca) is too much, a coarse oxide is formed and rolling contact fatigue life deteriorates. Thus, the content of calcium (Ca) is limited to the above-mentioned range. In addition, calcium (Ca) should not be added into an automotive wheel bearing steel as the deoxidizing agent.

The remainder of the bearing steel other than the above-described elements is composed of iron (Fe) and other unavoidable impurities.

In a bearing steel according to one embodiment of the present disclosure, a hardened layer having fine austenite crystal grains is formed on a surface of the bearing steel by adding grain refinement elements on the basis of medium carbon steel and performing heat treatment at a low temperature. Accordingly, the bearing steel may include a substrate and the hardened layer formed on a surface of the substrate. Here, the substrate includes a ferrite structure and a pearlite structure, and the hardened layer includes a martensite structure. The compositional components of the substrate and the hardened layer may be the same as those of the entire bearing steel.

The substrate includes a ferrite structure and a pearlite structure, and specifically, a volume fraction of ferrite may be 3 to 15%. Here, an average diameter of austenite crystal grains may be 22.5 to 31.8 μm.

The hardened layer includes a martensite structure unlike the substrate. In one embodiment of the present disclosure, the hardened layer having fine austenite crystal grains is formed through a high-frequency quenching process at a low temperature, so that durability, such as rolling contact fatigue life, can be improved. At this time, specifically, the austenite crystal grains formed on the hardened layer may have an average diameter of 5 μm or less. More specifically, the austenite crystal grains formed on the hardened layer may have an average diameter of 0.1 to 5 μm.

In one embodiment of the present disclosure, the rolling contact fatigue life of the bearing steel can be improved by minutely controlling the average size (crystal grain size) of austenite crystal grains.

A thickness of the hardened layer may be 25 to 65% with respect to a thickness of an outer race of the automotive wheel bearing. The rolling contact fatigue life of the bearing steel can be improved by providing the thickness of the hardened layer in the above-mentioned range.

The automotive wheel bearing according to one embodiment of the present disclosure may be formed of the above-described bearing steel.

A method of manufacturing a bearing steel according to one embodiment of the present disclosure may include: continuous casting and rolling a steel, the steel including 0.51 to 0.56 wt % of carbon (C), 0.30 to 0.55 wt % of silicon (Si), 0.60 to 0.90 wt % of manganese (Mn), 0.025 wt % or less (excluding 0 wt %) of phosphorus (P), 0.008 wt % or less (excluding 0 wt %) of sulfur (S), 0.01 to 0.20 wt % of chromium (Cr), 0.08 wt % or less (excluding 0 wt %) of molybdenum (Mo), 0.25 wt % or less (excluding 0 wt %) of nickel (Ni), 0.01 to 0.20 wt % of vanadium (V), 0.20 wt % or less (excluding 0 wt %) of copper (Cu), 0.003 wt % or less (excluding 0 wt %) of titanium (Ti), 0.01 to 0.05 wt % of aluminum (Al), 0.0015 wt % or less (excluding 0 wt %) of oxygen (O), 0.001 wt % or less (excluding 0 wt %) of calcium (Ca), and iron (Fe) and unavoidable impurities as a remainder; hot-forging the rolled steel; and high-frequency quenching and tempering the hot-forged steel.

In the method of manufacturing a bearing steel according to one embodiment of the present disclosure, firstly, a step of continuous casting and rolling a steel is performed. Since the components of the steel have been described, overlapping descriptions are omitted. Since the continuous casting and rolling also follows conventional continuous casting and rolling processes, the detailed descriptions thereof are omitted.

Next, a step of hot-forging the rolled steel is performed.

In the step of hot-forging, hot-forging may be carried out at a temperature of 1150 to 1250 degrees C. in accordance with the shape of a product.

After the step of hot-forging, a step of normalizing or refining may be performed.

In the step of normalizing, normalizing may be carried out at a temperature of 880 to 910 degrees C.

The step of refining may include a step of quenching at 850 to 880 degrees C. and a step of tempering at 500 to 600 degrees C. In the step of tempering, tempering may be carried out at a temperature range of preferably 500 to 550 degrees C.

Next, a step of high-frequency quenching and tempering the hot-forged steel is performed. High-frequency quenching is carried out in order to secure rolling contact fatigue life, wear resistance, and strength of main portions including raceway portions in the automotive wheel bearing. According to one embodiment, a heating temperature at the time of high-frequency quenching may be 750 to 1000 degrees C. Preferably, the heating temperature in the high-frequency quenching step may be 780 to 850 degrees C. When the heating temperature is too low at the time of high-frequency quenching, it fails to achieve austenitization of the steel. Due to such an incomplete transformation, ferrite remains and hardness and hardening depth are insufficient. Thus, it is impossible to ensure rolling contact fatigue life. When the heating temperature is too high at the time of high-frequency quenching, it negatively influences the rolling contact fatigue life of the automotive wheel bearing due to the coarsening of austenite crystal grains and excessively remaining austenite. The temperature for cooling completion at the time of high-frequency quenching may be 100 degrees C. or lower, and the cooling rate may be 700 to 750 degrees C./sec. High-frequency quenching means that quenching is carried out by high-frequency induced heating.

Next, the step of tempering at 150 to 200 degrees C. may be performed. Tempering may include high-frequency tempering or furnace tempering.

As described above, the substrate is formed and the hardened layer is formed on the surface of the substrate are formed through a series of processes according to one embodiment of the present disclosure. Since descriptions of structures of the substrate and the hardened layer are the same as those described above, overlapping descriptions are omitted.

In the manufacturing of a bearing part (for example, a hub or an outer race) using the bearing steel according to one embodiment, the step of hot-forging and the step of high-frequency quenching and tempering may be performed after the bearing part is shaped through the step of continuous casting and rolling. However, the method of manufacturing the bearing part using the bearing steel according to one embodiment is not limited thereto.

In the manufacturing of the bearing part (for example, the hub or the outer race) using the bearing steel according to one embodiment, the step of hot-forging and the step of high-frequency quenching and tempering may be performed in order to shape the bearing part through the step of continuous casting and rolling. However, the method of manufacturing the bearing part using the bearing steel according to one embodiment is not limited thereto.

Figure 3:
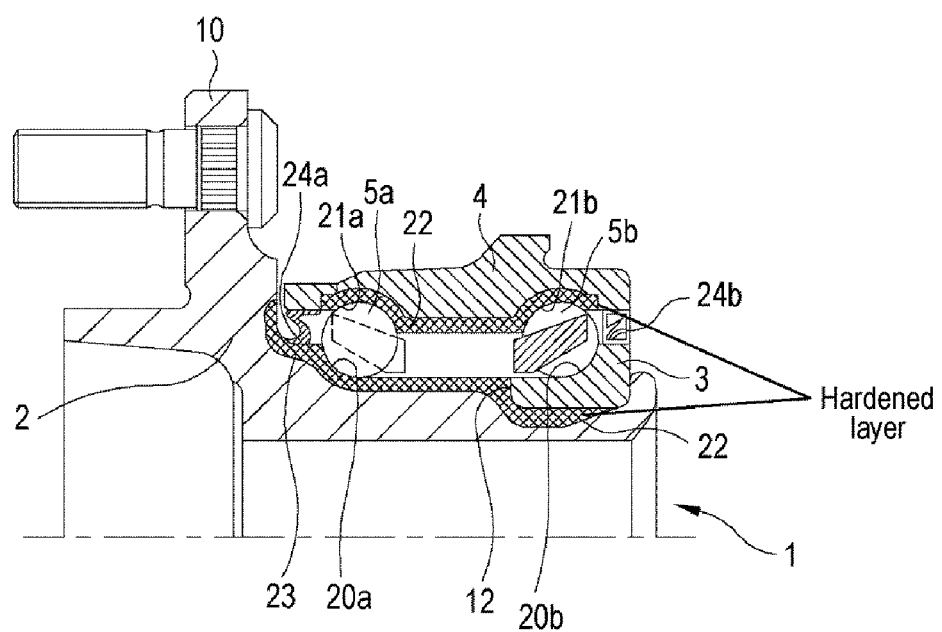
FIG. 3 is a schematic view showing one example of a wheel bearing using a bearing steel according to one embodiment of the present disclosure.

FIG. 3 is a schematic view showing one example of a wheel bearing using a bearing steel of one embodiment of the present disclosure. A wheel bearing 1 shown in FIG. 3 is exemplified as one of various kinds of wheel bearings for the convenience of explanation, and the technical idea of the present disclosure is not limited to the wheel bearing 1 exemplified as one example, but can be applied to various kinds of bearings. In other words, the bearing steel according to one embodiment is not limited to the exemplified wheel bearing 1, but can be applied to various kinds of bearings.

Meanwhile, for the convenience of explanation, in all the elements constituting the wheel bearing, a side closer to a wheel (not shown) is called outboard and a side far from the wheel is called inboard.

As shown in FIG. 3, the wheel bearing 1 according to one embodiment of the present disclosure includes: a hub 2; an inner race 3; an outer race 4; and a plurality of rows of rolling elements 5a and 5b. In one embodiment, the plurality of rows of rolling elements 5a and 5b are used as an example, but the present disclosure is not limited thereto. The number of rows of rolling elements 5a and 5b may be optionally determined by a person skilled in the art. Usually, the plurality of rows of rolling elements 5a and 5b may be formed by insertion into a plurality of first and second retainers made of a plastic material or another material.

The hub 2 has a cylindrical shape. An automotive wheel is coupled to an outboard end of the hub 2. To this end, a hub flange 10 protruding radially outwards and a pilot protruding toward the outboard along the rotation axis are formed in the outboard end of the hub 2. A bolt hole is punched in the hub flange 10 such that the automotive wheel can be coupled to the hub 2 by a coupling device, such as a bolt. The pilot serves to guide and support the wheel when the wheel is mounted to the hub 2. In addition, a stepped portion 12 is formed in an inboard end of the hub 2. A hub raceway 20a is formed on an outer circumferential surface between the stepped portion 12 of the hub 2 and the hub flange 10. A flange base 23 is formed between the hub flange 10 and the hub raceway 20a.

The inner race 3 is press-fitted into the stepped portion 12 of the hub 2. An inner raceway 20b is formed on an outer circumferential surface of the inner race 3.

The outer race 4 is mounted in radially outward side of the hub 2 to surround the hub 2 and the inner race 3. First and second outer raceways 21a and 21b, which correspond to the hub raceway 20a and the inner raceway 20b, respectively, are formed on a radially inner circumferential surface of the outer race 4. A portion of a radially outer circumferential surface protrudes radially outward to form a flange. A bolt hole (not shown) is punched in the flange such that the outer race 4 can be coupled to a car body (especially, a knuckle) by a coupling device, such as a bolt.

A first row of rolling elements 5a are disposed between the hub raceway 20a and the first outer raceway 21a. A second row of rolling elements 5b are disposed between the inner raceway 20b and the second outer raceway 21b. The first and second rows of rolling elements 5a and 5b allow the outer race 5 to be rotatable relatively with respect to the hub 2 and the inner race 3.

In addition, a first sealing member 24a for preventing the invasion of foreign substances, such as dust or moisture, is mounted between the hub flange 10 and an outboard end of the outer race 4. A second sealing member 24b for preventing the invasion of foreign substances, such as dust or moisture, is mounted between an inboard end of the outer race 4 and the outer circumferential surface of the inner race 3. The first and second sealing members 24a and 24b may be the same type of sealing members or different types of sealing members.

Meanwhile, in the wheel bearing 1 according to one embodiment, the hardened layer 22 is formed on the hub 2 and the outer race 4. Specifically, a lip of the first sealing member 24a may be in contact with the hub 2. An entire section from the flange base 23, which mainly absorbs an external impact, to at least a portion of an axial extending portion of the stepped portion 12 via the hub raceway 20a and the inner raceway 20b may be heat-treated. In addition, in the outer race 4, an entire section from the first outer raceway 21a to the second outer raceway 21b may be heat-treated. The hardened layer 22 may be formed by high-frequency quenching or the like. The hardened layer 22 may be formed to have an uniform thickness.

Hereinafter, the method of manufacturing the bearing steel according to the present disclosure will be described in detail through examples.

<Experimental Example 1> Composition of Steel

Tables 1 and 2 show components of a reference steel of a bearing steel according to one embodiment of the present disclosure and components of a bearing steel manufactured by adding main alloy elements to the reference steel. In addition, Table 3 shows mechanical properties of the reference steel of the bearing steel according to the embodiment of the present disclosure and a comparative steel.

In order to manufacture steel materials having compositions shown in Tables 1 and 2 below, a melting process is performed in a 100-ton electric furnace, and then a refining process and a vacuum degassing process are performed, such that blooms and billets are manufactured. In addition, for example, the billets manufactured by these processes were subjected to a continuous casting process such that steel bars having final diameters of 55 mm and 65 mm are manufactured. Microstructures and mechanical properties of the steel bar manufactured by such processes are shown in Table 3. The comparative steel is S55C-based bearing steel which is currently used as commercial steel. As shown in Table 3, when compared with the comparative steel (Comparative Example 1), the reference steel (Example 1) has the same microstructure as the comparative steel. However, all the mechanical properties, such as yield strength, tensile strength, elongation, and rotary bending fatigue strength are significantly improved. Here, a normalized sample is used as a sample for measuring rotary bending fatigue strength.

<Experimental Example 2> Temperature of High-Frequency Heat Treatment

Round bar samples with a diameter of 12 mm and a length of 100 mm for the reference steel (Example 1) and the comparative steel (Comparative Example 1) were manufactured. Then, for each sample, the diameter of austenite crystal grains formed on the hardened layer of the bearing steel according to the heating temperature of high-frequency heat treatment was measured. The results are shown in Table 4 below. The diameter of austenite crystal grains in the reference steel according to one embodiment was minutely observed in all the heating temperature sections of high-frequency heat treatment compared with that in the comparative steel. Especially, fine austenite crystal grains having an average diameter of 5 μm or less can be obtained at a low heating temperature of 800 degrees C. or lower.

TABLE 1

| Component | C (wt %) | Si (wt %) | Mn (wt %) | P (wt %) | S (wt %) | Cr (wt %) | Mo (wt %) | Ni (wt %) | V (wt %) |
|---|---|---|---|---|---|---|---|---|---|
| Example 1 | 0.53 | 0.47 | 0.79 | 0.008 | 0.003 | 0.15 | 0.010 | 0.04 | 0.09 |
| Example 2 | 0.54 | 0.49 | 0.75 | 0.009 | 0.003 | 0.14 | 0.010 | 0.03 | 0.12 |
| Example 3 | 0.54 | 0.50 | 0.78 | 0.009 | 0.004 | 0.15 | 0.009 | 0.04 | 0.10 |
| Comparative Example 1 | 0.56 | 0.25 | 0.79 | 0.011 | 0.002 | 0.16 | 0.010 | 0.04 | 0.007 |

TABLE 2

| Component | Cu (wt %) | Ti (wt %) | Al (wt %) | O (wt %) | Ca (wt %) | Fe (wt %) |
|---|---|---|---|---|---|---|
| Example 1 | 0.086 | 0.0024 | 0.034 | 0.00051 | 0.0004 | Remainder |
| Example 2 | 0.082 | 0.0022 | 0.031 | 0.0005 | 0.0003 | Remainder |
| Example 3 | 0.084 | 0.0024 | 0.040 | 0.0006 | 0.0004 | Remainder |
| Comparative Example 1 | 0.078 | 0.0019 | 0.014 | 0.00063 | 0.0002 | Remainder |

TABLE 3

| Component | Microstructure | Yield strength (MPa) | Tensil strength (MPa) | Elongation (%) | Rotary bending fatigue strength (MPa) |
|---|---|---|---|---|---|
| Example 1 | Ferrite + Pearlite | 507 | 870 | 20 | 373 |
| Example 2 | Ferrite + Pearlite | 488 | 860 | 18.2 | 366 |
| Example 3 | Ferrite + Pearlite | 452 | 848 | 16.4 | 329 |
| Comparative Example 1 | Ferrite + Pearlite | 424 | 820 | 17 | 314 |

TABLE 4

| Steel component | Microstructure | High-frequency heat treatment temperature (° C.) | Average diameter of austenite crystal grains (μm) |
|---|---|---|---|
| Example 1 | Martensite | 700 | 4.5 |
| Example 1 | Martensite | 750 | 4.5 |
| Example 1 | Martensite | 780 | 5.0 |
| Example 1 | Martensite | 820 | 8.7 |
| Example 1 | Martensite | 840 | 8.2 |
| Example 1 | Martensite | 870 | 12.4 |
| Example 1 | Martensite | 940 | 16.8 |

TABLE 4-continued

| Steel component | Microstructure | High-frequency heat treatment temperature (° C.) | Average diameter of austenite crystal grains (μm) |
|---|---|---|---|
| Example 1 | Martensite | 950 | 15.4 |
| Comparative Example 1 | Mertensite | 700 | 6.7 |
| Comparative Example 1 | Martensite | 750 | 8.9 |

TABLE 4-continued

| Steel component | Microstructure | High-frequency heat treatment temperature (° C.) | Average diameter of austenite crystal grains (μm) |
|---|---|---|---|
| Comparative Example 1 | Martensite | 780 | 12.5 |
| Comparative Example 1 | Martensite | 820 | 13.6 |
| Comparative Example 1 | Martensite | 840 | 19.8 |
| Comparative Example 1 | Martensite | 870 | 19.7 |
| Comparative Example 1 | Martensite | 940 | 21.3 |
| Comparative Example 1 | Martensite | 950 | 17.9 |

As shown in Table 5, it could be confirmed that Example 1, which satisfies the composition according to one embodiment of the present disclosure, satisfied the condition that the average diameter of austenite crystal grains in the hardened layer was 5 μm or less and was excellent in view of tensile strength, elongation, rotary bending fatigue life, and rolling contact fatigue life.

On the other hand, it could be confirmed that Comparative Example 1, which does not satisfy the composition according to one embodiment of the present disclosure, had a coarse average diameter of austenite crystal grains and was inferior in view of tensile strength, elongation, rotary bending fatigue life, and rolling contact fatigue life.

TABLE 5

| Steel component | Microstructure | Average diameter of austenite crystal grains (μm) | Yield strength (MPa) | Tensil strength (MPa) | Elongation (%) | $L_{10}$ lifetime (×$10^6$) |
|---|---|---|---|---|---|---|
| Example 1 | Martensite | 5.0 | 1,888 | 2,405 | 3.7 | 1.9 |
| Example 2 | Martensite | 7.3 | 1,873 | 2,206 | 2.9 | 1.3 |
| Example 3 | Martensite | 9.8 | 1,869 | 2,109 | 1.7 | 1.2 |
| Comparative Example 1 | Martensite | 12.5 | 1,877 | 2,005 | Less than 1.0 | 0.6 |

Figure 2:
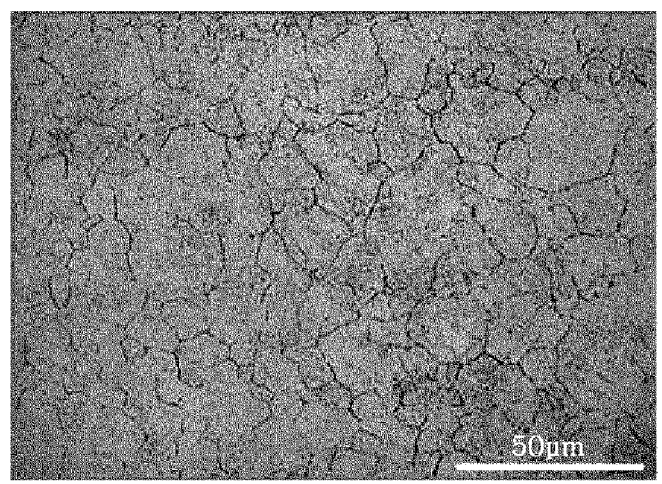
FIG. 2 is an optical microscopic image showing a microstructure of a hardened layer in a bearing steel according to Comparative Example 1.

In addition, the microstructures of austenite crystal grains formed by performing high-frequency heat treatment with respect to the reference steel of Example 1 and the comparative steel of Comparative Example 1 to at a temperature of 780 degrees C. are shown in FIGS. 1 and 2, respectively. As shown in FIG. 1, it could be confirmed that, in the bearing steel manufactured by Example 1, fine austenite crystal grain microstructures were uniformly formed on the hardened layer. On the other hand, as shown in FIG. 2, it could be confirmed that, in the bearing steel manufactured by Comparative Example 1, coarse austenite grain microstructures were formed on the hardened layer.

<Experimental Example 3> Rolling Contact Fatigue Test

A rolling contact fatigue test was conducted for each of the reference steel and the comparative steel. The rolling contact fatigue test was conducted using a thrust type rolling contact fatigue tester. Each sample used in the rolling contact fatigue test had a disc shape with an outer diameter of 60 mm, an inner diameter of 30 mm, and a thickness of 8 mm. The sample was subjected to high-frequency quenching at 800 degrees C. and then tempering at 160 degrees C. so that the sample had a surface hardening depth of 3 mm. The rolling contact fatigue test was conducted on these samples until the sample was exfoliated under conditions of a maximum contact stress of 5.8 GPa, a revolution rate of 1500 rpm, and a purified lubrication, and the number of revolutions was measured. The $L_{10}$ lifetime indicating a damage possibility of 10% in the Weibull distribution was evaluated.

Table 5 shows the microstructure, average diameter of austenite crystal grains in the hardened layer, mechanical properties of the hardened layer, and rolling contact fatigue life of the hardened layer, as test results of Experimental Examples 2 and 3 for the reference steel (Example 1) and the comparative steel (Comparative Example 1).

<Experimental Example 4> Automotive Wheel Bearing Durability Test

An outer race and a hub in a third-generation wheel bearing for vehicle were manufactured in accordance with bearing steels of Example 1 and Comparative example 1, respectively. The wheel bearings were compared and evaluated for service life.

Hereinafter, a process of manufacturing the wheel bearing will be described. A steel bar with a diameter of 55 mm and a diameter of 65 mm was hot-forged at 1200 degrees C. and then normalized. Main portions including raceway portions were subjected to high-frequency heat treatment at about 800 degrees C. (Example 1) and about 900 degrees C. (Comparative example 1), followed by an orbital forming process. Finally the outer race and the hub are manufactured, respectively.

As shown in Table 6, it could be confirmed that Example 1 according to the present disclosure satisfied all the performances required for the automotive wheel bearing, such as service life, high-load test, curb impact test, and the like, and especially, the service life of Example 1 had significantly excellent results compared with that of Comparative Example 1.

TABLE 6

| Steel component | Service life (hr) | High-load test | Curb Impact Test |
|---|---|---|---|
| Example 1 | 443 | 1.68 | No crack |
| Comparative Example 1 | 215 | 1.66 | No crack |

Some embodiments and examples of the present disclosure have been described above with reference to the accompanying drawings. However, it is to be understood by those skilled in the art that the present disclosure may be implemented in another particular form without changing the technical spirit or an essential feature thereof.

Thus, it is to be understood that the above-described embodiments are illustrative in all aspects and do not limit the present disclosure. The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A bearing steel having a composition comprising:
   0.51 to 0.56 wt % of carbon (C);
   0.30 to 0.55 wt % of silicon (Si);
   0.60 to 0.90 wt % of manganese (Mn);
   0.025 wt % or less (excluding 0 wt %) of phosphorus (P);
   0.008 wt % or less (excluding 0 wt %) of sulfur (S);
   0.01 to 0.20 wt % of chromium (Cr);
   0.08 wt % or less (excluding 0 wt %) of molybdenum (Mo);
   0.04 wt % or less (excluding 0 wt %) of nickel (Ni);
   0.01 to 0.20 wt % of vanadium (V);
   0.20 wt % or less (excluding 0 wt %) of copper (Cu);
   0.003 wt % or less (excluding 0 wt %) of titanium (Ti);
   0.01 to 0.05 wt % of aluminum (Al);
   0.0015 wt % or less (excluding 0 wt %) of oxygen (O);
   0.001 wt % or less (excluding 0 wt %) of calcium (Ca); and
   iron (Fe) and unavoidable impurities as a remainder,
   wherein the bearing steel comprises:
     a substrate, and
     a hardened layer formed on a surface of the substrate,
   wherein the substrate comprises:
     a ferrite structure, and
     a pearlite structure,
     the hardened layer comprises a martensite structure,
     austenite crystal grains having an average diameter of 22.5 to 31.8 μm are formed on the substrate, and
     austenite crystal grains having an average diameter of 5 μm or less are formed on the hardened layer.

2. A method of manufacturing the bearing steel of claim 1, the method comprising:
   continuous casting and rolling a steel; hot-forging the rolled steel; and
   high-frequency quenching and tempering the hot-forged steel.

3. The method of claim 2, wherein, in the step of hot-forging, the temperature of the hot-forging is 1,150 to 1,250 degrees C.

4. The method of claim 2, further comprising normalizing or refining after the hot-forging.

5. The method of claim 4, wherein, in the step of normalizing, the temperature of the normalizing is 880 to 910 degrees C.

6. The method of claim 4, wherein the refining comprises: quenching at 850 to 880 degrees C.; and tempering at 500 to 600 degrees C.

7. The method of claim 2, wherein, in the step of high-frequency quenching and tempering, the temperature of the high-frequency quenching is 750 to 1,000 degrees C.

8. The method of claim 2, wherein, in the step of high-frequency quenching and tempering, the temperature of the high-frequency quenching is 780 to 850 degrees C.

9. The method of claim 2, wherein, in the step of high-frequency quenching and tempering, the temperature of the tempering is 150 to 200 degrees C.

10. An automotive wheel bearing comprising the bearing steel of claim 1.

* * * * *